United States Patent Office 3,081,227
Patented Mar. 12, 1963

3,081,227
**ENDODENTAL STERILIZING AND ANESTHE-
TIZING COMPOSITION**
Ruff R. Wimberly, 501 Park St., Greggton, Tex.
No Drawing. Filed June 28, 1960, Ser. No. 39,207
2 Claims. (Cl. 167—60)

This invention relates to a sterilizing antiseptic and anesthetizing composition. In particular, this invention relates to an endodental sterilizing and anesthetizing composition.

Heretofore in the dental profession, various bactericidal and fungicidal compositions have been used for the sterilization of endodental cavities and among these have been concentrated sulfuric acid, phenol, paracresol, formaldehyde, paracresol, paradichlorophenol, cresol and camphor. Some of the aforesaid agents have been effective against certain of the gram positive bacteria found in the endodental cavity, some of them have been effective against certain of the gram negative bacteria found in the endodental cavity, and some of them have been effective against certain of the fungi found in the endodental cavity. However, the prior art does not show a sterilizing agent which is effective against the majority of the gram positive and gram negative bacteria, and the fungi which are found in the endodental cavity. Furthermore, the prior art compositions, while being somewhat effective against bactericidal and fungicidal activities do not include anesthetic properties which is certainly required in a tooth socket after extraction of a tooth.

Moreover, certain of the materials heretofore employed endeavoring to sterlize the endodental cavity, such, for example, as concentrated sulfuric acid, phenol, and others, have been subject to the disadvantage of objectionable features which resides in the fact that they tend to denature, precipitate, mummify, burn, dissolve or otherwise degrade and destroy not only the tissues in the endodental cavity but also the contiguous apical tissues. These compositions are otherwise unsatisfactory and require a great deal of experience in proper administration by a dentist.

Accordingly, it is a primary object of the present invention to provide a new and improved endodental sterilizing agent and anesthetic agent in the form of a combination of bactericidal, fungicidal and anesthetic compositions for use in the treatment and sterilization of an infected endodental cavity which is effective against the majority of gram positive bacteria and gram negative bacteria as well as the fungi encountered in the endodental cavity while, at the same time, being devoid of the objectionable features of prior art endodental sterilizing materials including the tendency of certain of the latter to damage the tissues of the endodental cavity.

It is another object of the present invention to provide a new and improved endodenal sterilizing and anesthetizing composition or combination bactericidal and fungicidal composition for use in the treatment of the endodental cavity which may be put up and readily sold to the dental profession.

It is yet another object of the present invention to provide a new and improved sterilizing and anesthetizing composition which may be easily applied to a backing material and inserted into the endodental cavity or area.

It is a further object of the present invention to provide a new and improved sterilizing anesthetizing composition which, while being particularly adapted for use in the sterilization and anesthetization of the endodental cavity, may also be used as a general non-toxic topical antiseptic and anesthetic solution for use in the oral cavity and elsewhere in and on the human body.

Additional objects and advantages of the present invention will be apparent in the following description.

The active ingredients in the present composition are benzocaine, lanolin, Aquaphor and sulfathiazole. Benzocaine is the ethyl ester of p-aminobenzoic acid. It is prepared by the esterification of p-aminobenzoic acid. It is used as an anesthetic. Lanolin (hydrous) is wool fat with 25-30% water. It is yellowish white, unctuous mass having a slight odor and is used as a base. Aquaphor is an oil in water dispersion which is hydrophillic and is a registered trademark of Duke Laboratories, Inc. of Stamford, Connecticut. The oil is a petrolatum. Sulfathiazole is a well known antiseptic which is effective against certain diseases due to Staphylococci, Streptococci, Pasteurella and Shigella.

In the practice of the present invention, the composition may be prepared in accordance with the following preferred example:

*Example I*

| | | |
|---|---|---|
| Benzocaine | grains | 45 |
| Lanolin | dr. ap. | 6 |
| Aquaphor | dr. ap. | 2 |
| Sulfathiazole | grams | 5 |

The ingredients are mixed to produce a paste which is ready for use. In order to treat the socket, a small piece of cotton wadding is dampened with water. The cotton is then positioned over the socket. The patient, by biting into the dampened cotton, molds it to conform to he socket. The molded cotton is then removed from the patient's mouth and the formulation of the present invention is applied thickly to the surface of the cotton. An approximate amount required is one fourth teaspoon to a socket. The coated cotton wadding is then replaced and the patient is instructed to bite down and to keep pressure on the wadding for about one and one-half hours. The cotton may then be discarded.

It will be appreciated that the technique employed herein is ingenious since the socket is not only treated with a potent medicinal composition but the pressure from the cotton causes the blood to clot and assists in preventing saliva from contaminating the socket.

*Example II*

| | | |
|---|---|---|
| Benzocaine | grains | 40 |
| Lanolin (hydrous) | dr. ap. | 7 |
| Aquaphor | dr. ap. | 1.5 |
| Sulfathiazole | grams | 6 |

The ingredients are mixed to form a paste and employed as in connection with Example I.

*Example III*

| | | |
|---|---|---|
| Benzocaine | grains | 50 |
| Lanolin (hydrous) | dr. ap. | 5 |
| Aquaphor | dr. ap. | 2.5 |
| Sulfathiazole | grams | 4 |

The ingredients are mixed and employed as in the other examples.

It will be apparent that many changes and modifications of the several features of the composition and use therefor described herein may be made without departing from the spirit and scope of the invention. It is, therefore, to be understood that the foregoing description is by way of illustration of the invention rather than limitation upon the invention.

What is claimed as new is as follows:

1. A method for treating a dry socket comprising making an impression of the tooth socket with dampened cotton wadding, removing the molded cotton and then coating the cotton wadding with a composition consisting essentially of between about 40 to 50 grains benzocaine, between about 5 to 7 apothecaries' dram lanolin, between about 1.5 to 2.5 apothecaries' dram hydrophilic oil and water dispersion and between about 4 to 6 grams sulfathiazole, and placing the coated wadding in the socket.

2. A method for treating a dry socket comprising making an impression of the tooth socket with dampened cotton wadding removing the molded cotton and then, coating the cotton wadding with a composition consisting essentially of approximately 45 grains benzocaine, approximately 6 apothecaries' dram lanolin, approximately 2 apothecaries' dram hydrophilic oil and water dispersion and approximately 5 grams sulfathiazole, and placing the coated wadding in the socket.

References Cited in the file of this patent

UNITED STATES PATENTS

| | | |
|---|---|---|
| 2,448,180 | Helgren | Aug. 31, 1948 |
| 2,628,182 | Reasenberg | Feb. 10, 1953 |
| 2,634,228 | Kelly et al. | Apr. 7, 1953 |
| 2,644,232 | Roubian | July 7, 1953 |
| 2,804,421 | Stirm | Aug. 27, 1957 |
| 2,991,224 | Bell | July 4, 1961 |

OTHER REFERENCES

Hubell et al.: Am. Prof. Pharm., vol. 8, No. 2, page 116.
Wilson: Am. Drug Index, 1959, page 108.